United States Patent [19]
Ito et al.

[11] Patent Number: 5,431,266
[45] Date of Patent: Jul. 11, 1995

[54] SHIFT LOCK SYSTEM

[75] Inventors: Yasuhiko Ito, Zama; Kazuo Takeuchi, Atsugi, both of Japan

[73] Assignee: Nissan Motor Co., Ltd., Yokohama, Japan

[21] Appl. No.: 158,795

[22] Filed: Dec. 1, 1993

[30] Foreign Application Priority Data

Dec. 2, 1992 [JP] Japan .................................. 4-323160
Dec. 2, 1992 [JP] Japan .................................. 4-323162

[51] Int. Cl.6 .................. B60K 41/26; G05G 11/00
[52] U.S. Cl. ...................................... 192/4 A; 74/475
[58] Field of Search ............. 192/4 A; 180/271; 74/475, 490.11

[56] References Cited

U.S. PATENT DOCUMENTS

| | | | |
|---|---|---|---|
| 1,272,072 | 7/1918 | Madsen | 70/455 X |
| 1,382,183 | 6/1921 | Fekete | 70/455 X |
| 4,909,096 | 3/1990 | Kobayashi | 192/4 A X |
| 4,930,609 | 6/1990 | Bois et al. | 192/4 A |
| 4,934,496 | 6/1990 | Barske et al. | 192/4 A |
| 4,947,967 | 8/1990 | Kito et al. | 192/4 A |
| 5,025,901 | 6/1991 | Kito et al. | 192/4 A |
| 5,150,593 | 9/1992 | Kobayashi et al. | 192/4 A X |
| 5,186,069 | 2/1993 | Asano et al. | 192/4 A X |
| 5,187,999 | 2/1993 | Kobayashi et al. | 192/4 A X |
| 5,207,740 | 5/1993 | Ikushima et al. | 192/4 A |
| 5,247,849 | 9/1993 | Sato | 74/475 |
| 5,255,570 | 10/1993 | Shirahama et al. | 192/4 A X |
| 5,257,551 | 11/1993 | Iwata | 192/4 A X |
| 5,309,744 | 5/1994 | Kito et al. | 192/4 A X |

*Primary Examiner*—Andrea L. Pitts
*Attorney, Agent, or Firm*—Foley & Lardner

[57] ABSTRACT

A shift lock system for an automatic transmission is arranged to make it unfeasible to cancel the shift lock without a tool. The shift lock system includes a cancel lever for moving a shift lock member such as a rotary bush from a lock position for locking a shift lever in the park position to an unlock position against the force of a return spring, a cancel rod for operating the cancel lever, and a plug member which is normally fastened with the cancel rod to a support member by a screw fastener so that the cancel rod is immovable. The plug member can be loosened by a tool such as a screw driver. When loosened, the plug member allows a canceling operation by allowing the cancel rod to be moved.

22 Claims, 16 Drawing Sheets

FIG.21A
(PRIOR ART)
FIG.22A
(PRIOR ART)
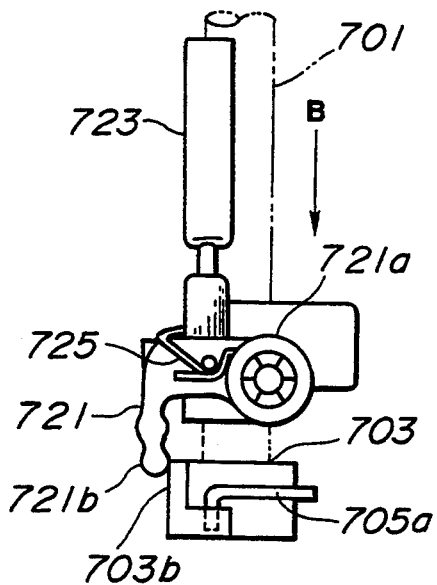 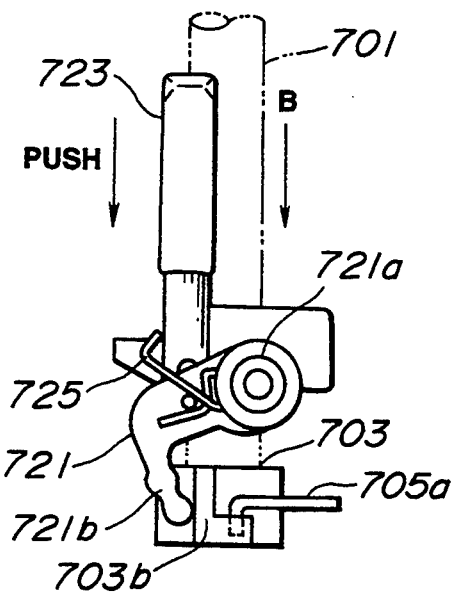
FIG.21B
(PRIOR ART)
FIG.22B
(PRIOR ART)
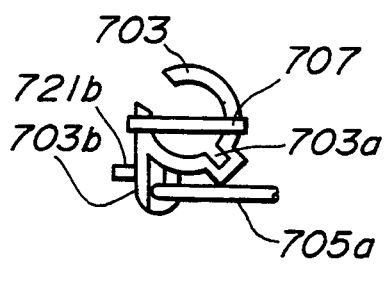 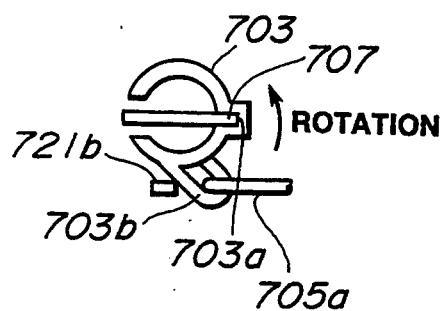

SHIFT LOCK SYSTEM

BACKGROUND OF THE INVENTION

The present invention relates to a shift lock system for an automatic transmission.

One conventional shift lock system is shown in FIGS. 16~21. This shift lock system is mounted on a motor vehicle equipped with an automatic transmission, and includes a shift lever 701 of the automatic transmission, a rotary bush 703 provided at the lower portion of the shift lever 701, and an electromagnetic actuator including a shift lock solenoid 705.

The rotary bush 703 is provided below a lock pin 707, and rotatable between a lock angular position and an unlock angular position. The rotary bush 703 has an unlock recess 703a, which allows the lock pin 707 of the shift lever 791 to move downward when the rotary bush 703 is in the unlock position.

The rotary bush 705 is connected with a solenoid rod 705a of the shift lock solenoid 705. The solenoid rod 705a is urged in a projecting direction by a spring 730 schematically shown in FIG. 21.

The shift lock solenoid 705 is electrically connected with a controlling means which includes a shift lock control unit 732 for energizing and deenergizing the shift lock solenoid 705 in accordance with signals sent from various switches and sensors 733 (serving as a sensing means). In this example, the shift solenoid 705 is off when a key switch (or ignition switch or vehicle main switch) is in an on position, and a brake pedal of the vehicle is not depressed. In this state, the spring 730 (serving as a resilient means) applies a spring force to the solenoid rod 730, thrusts the solenoid rod 730 outward, and by so doing holds the rotary bush 703 in the lock position as shown in FIG. 16. In this position, the unlock recess 703a of the rotary bush 703 is not located just below the lock pin 707, and the upper end of the rotary bush 703 makes it impossible to lower the lock pin 707. The driver cannot lower a compression rod 713 by pushing a release button 711 of the shift lever 701, and cannot shift the shift lever 701 from the parking position.

When the key switch is in the on position and the brake pedal is depressed, the shift solenoid 705 becomes on and rotates the rotary bush 703 to the unlock position by withdrawing the solenoid rod 705a, In the unlock position, the unlock recess 703a is aligned with the lock pin 707 and allows the downward movement of the lock pin 707. By this downward movement, the lock pin 707 is moved out of a groove formed in a position plate 709 and the shift lever 701 is allowed to move from the parking position.

When the shift lever 701 is away from the parking position, a detent switch is on, and accordingly, the shift lock solenoid 705 is off. Therefore, the spring 730 tries to return the rotary bush 703 to the lock position. However, a lock lever 715 is arranged to prevent the rotary bush 703 from returning to the lock position. As shown in FIG. 17, the lock lever 715 is loaded by a spring 717, and has a first arm 715a for abutting on a stopper 719 and a second arm for abutting on an abutment wall 703b of the rotary bush 703. When the shift lever 701 is in the parking position, the stopper 719 abuts on the first arm 715a, and holds the second arm 715b away from the abutment wall 703b of the rotary bush 703. When the shift lever 701 is moved from the P position toward the R (reverse) position as shown in FIG. 18, the lock lever 715 is moved away, and released, from the stopper 719. Therefore, the lock lever 715 is rotated by the force of the spring 717 and holds the rotary bush 703 in the unlock position to allow the shifting of the shift lever 701, by pushing the abutment wall 703b of the rotary bush 703 with the second arm 715b. When the shift lever 701 is returned to the parking position, the first arm 715a of the lock lever 715 comes in contact with the stopper 719 again, and accordingly, the rotary bush 703 rotates by the action of the spring 730 to the lock position.

This conventional shift lock system further includes a cancel arrangement for allowing the driver to unlock the shift lever 701 even if the shift lock solenoid 705 becomes unable to unlock the shift lever. As shown in FIGS. 19A~20B, this cancel arrangement includes a cancel lever 721 and a cancel knob 723. The cancel lever 721 has a pivoted portion 721a which is rotatably supported on the shift lever 701, and an arm having an end 721b confronting the abutment wall 703b of the rotary bush 703. A spring 725 normally holds the cancel lever 721 in the non-cancel position shown in FIGS. 19A and 19B. The cancel knob 723 extends along the shift lever 701, and has a lower end linked with the cancel lever 721 and an upper end which is exposed a little in front of the shift lever 701 in the passenger compartment.

If the shift lock solenoid 705 fails because of a trouble in the electrical circuit, then the rotary bush 703 is immovable in the lock position, and the shift lever 701 remains locked in the park position even if the key switch is on and the brake pedal is depressed. In this awkward situation, the driver is still able to unlock the shift lever 701 manually by pushing the cancel knob 723. When the cancel knob 723 is pushed down in the lock state shown in FIGS. 19A and 19B, the cancel lever 721 swings down against the force of the spring 725 as shown in FIG. 20A, and forcibly rotates the rotary bush 703 to the unlock position by pushing the abutment wall 703b with the arm end 721b. This cancel knob 123 can be readily operated by hand without any special tool.

SUMMARY OF THE INVENTION

It is an object of the present invention to provide a shift lock system which is not readily canceled.

According to the present invention, a shift lock system comprises a shift locking means for locking and unlocking a shift lever of an automatic transmission; a canceling means comprising a cancel rod and a plug member, and a support member for supporting the cancel rod and the plug member of the canceling means.

The shift locking means comprises a shift lock member, such as a shift lock rotary bush, movable between a lock position for locking the shift lever and an unlock position for unlocking the shift lever, and an actuating means, such as an electromagnetic actuator and a return spring, for causing the shift lock member to move between the lock and unlock position.

The canceling means is for moving the shift lock member from the lock position to the unlock position even when the actuating means is in a state to hold the shift lock member in the lock position.

The cancel rod is arranged to cause the shift lock member (the rotary bush) to move from the lock position to the unlock lock position when the cancel rod is moved in one direction. The canceling means may further comprise a cancel lever for moving the shift lock member (the rotary bush) from the lock position to the unlock position. In this case, the cancel rod is connected or associated through the cancel lever with the shift lock member so that motion is transmitted through the cancel lever to the shift lock member.

The canceling means further comprises a fastening means for fastening the cancel rod and the plug member to the support member and allowing the cancel rod to be moved in the direction to operate the shift lock member only when the fastening means is untightened. The fastening means may comprises a screw member such as a screw fastener screwed into the cancel rod.

This shift lock system can prevent the cancel rod from being moved manually when the fastening means is tightened.

BRIEF DESCRIPTION OF THE DRAWINGS

FIG. 21 is a side view showing a cancel arrangement of the conventional shift lock system.

FIG. 21B is a view as viewed in a direction of an arrow B in FIG. 19A.

FIG. 22A is a side view showing the cancel arrangement of the conventional shift lock system in the state in which the cancel arrangement is pushed down.

FIG. 22B is a view as viewed in a direction of an arrow B in FIG. 20 A.

DETAILED DESCRIPTION OF THE INVENTION

FIGS. 1~8 show a shift lock system 3 of an automatic transmission in a first example according to a first embodiment of the present invention. The shift lock system 3 is designed to allow a shift lever 1 of the automatic transmission to be shifted from the P (parking) position only when a predetermined condition is met.

Figure 1:
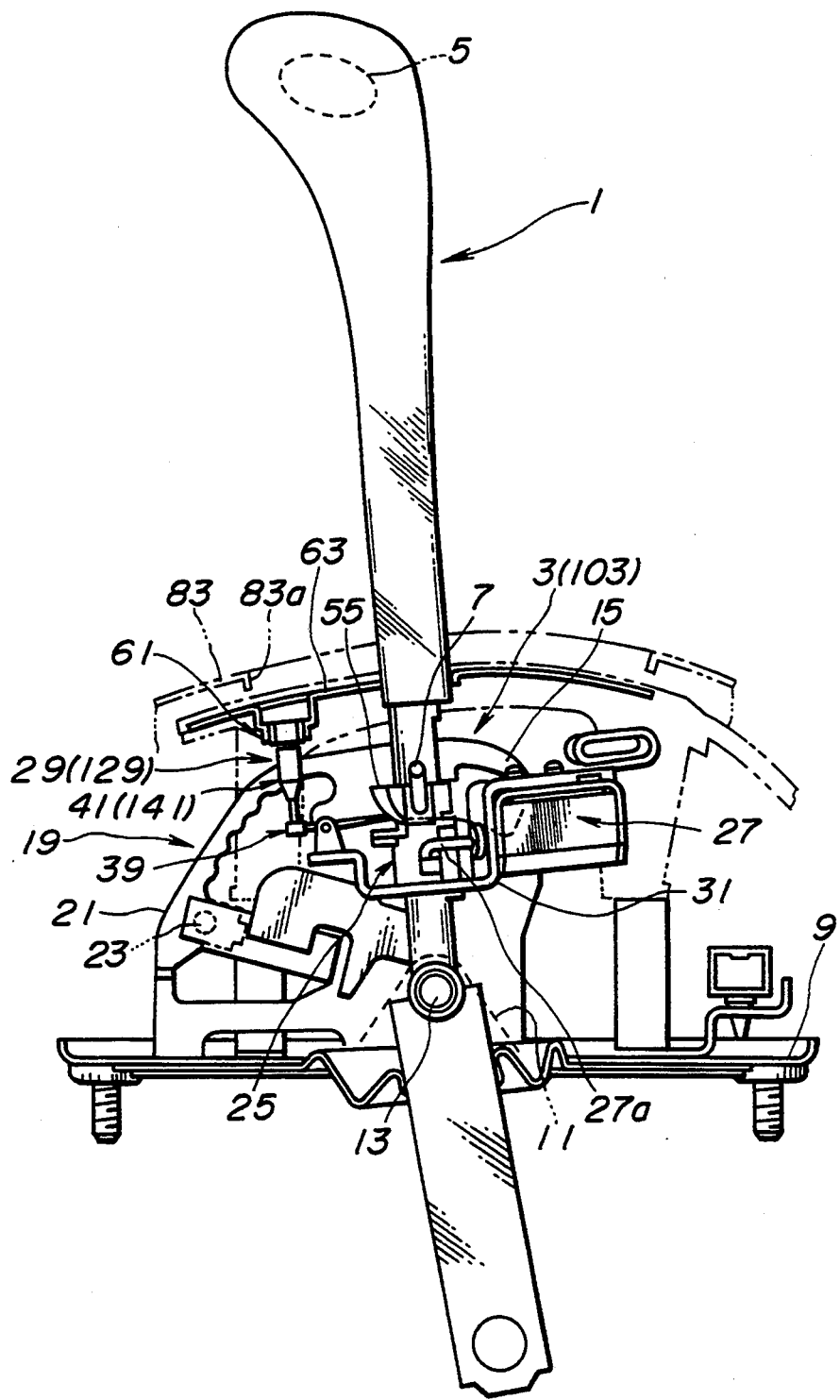
FIG. 1 is a sectional view showing a shift lock system according to a first embodiment of the present invention.
Figure 18:
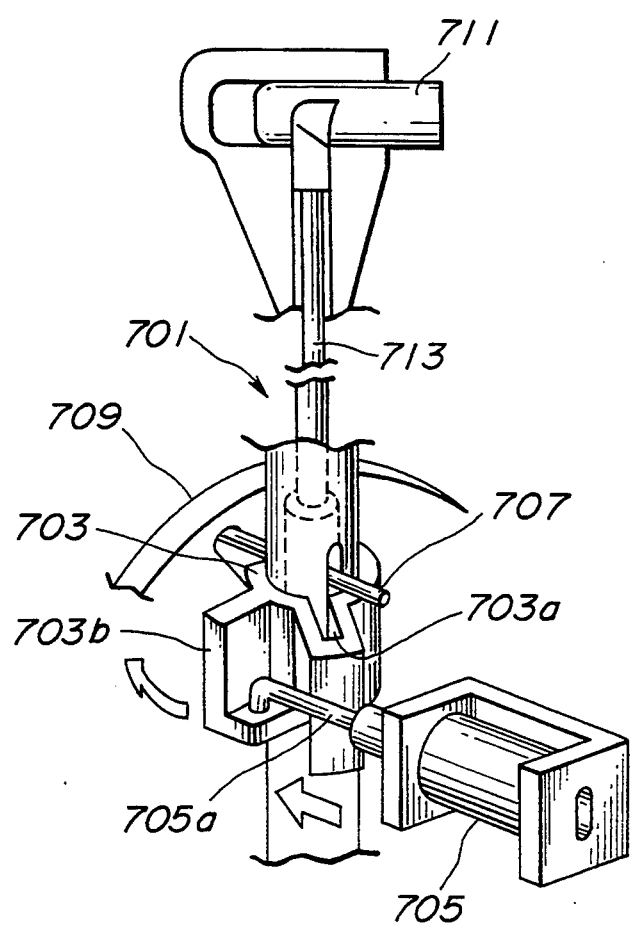
FIG. 18 is a perspective view showing a conventional shift lock system.
Figure 19:
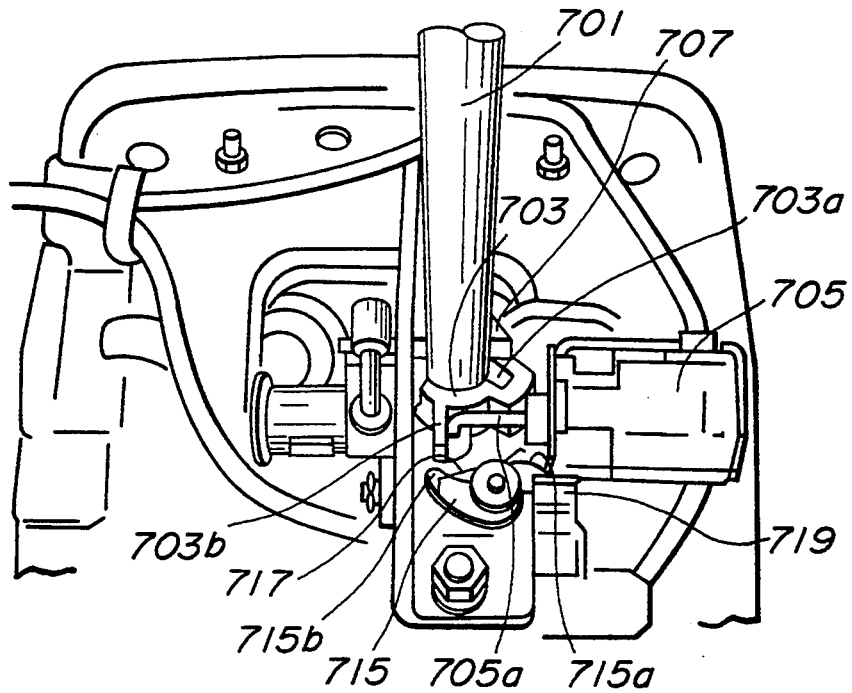
FIG. 19 is a perspective view showing a lock lever and a shift lever of the conventional shift lock system when the shift lever is in the park position.
Figure 20:
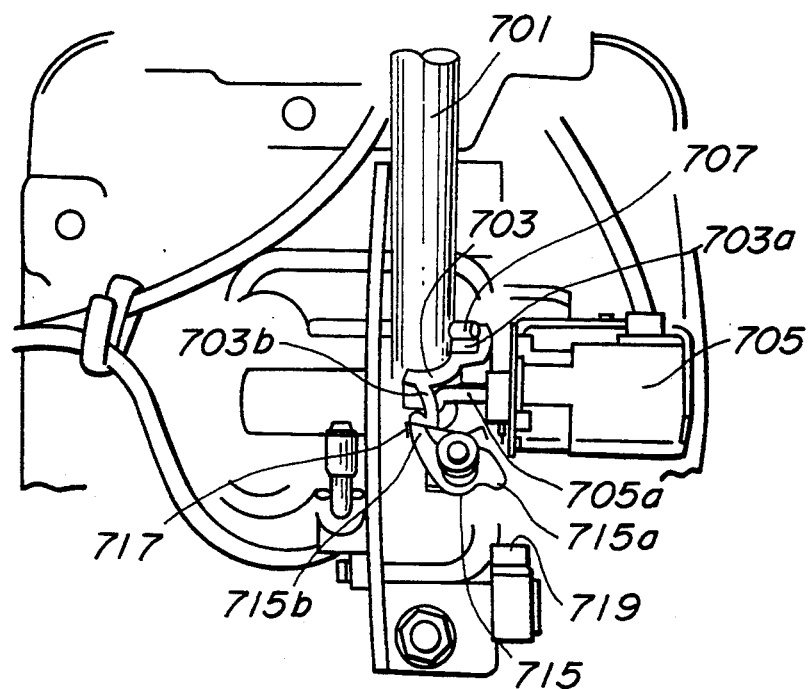
FIG. 20 is a perspective view showing the lock lever and the shift lever of the conventional system when the shift lever is away from the park position.

As shown in FIG. 1, the shift lever 1 has a release button 5 and a lock pin 7 fixed to a lower end of a compression rod (corresponding to the compression rod 713 shown in FIG. 18). The shift lever 1 is swingably supported through a pin 13 on a bracket 11 of a base plate 9 which is fixed to the upper side of a floor tunnel in a passenger compartment of a vehicle. The lower end of the shift lever 1 is connected through a linkage with a manual lever for operating a manual valve of the automatic transmission of the vehicle.

In this way, the shift lever assembly including the shift lever 1, the release button 5 etc. is movably mounted on the stationary base structure which includes the base plate 9 etc. and which is fixed to the vehicle body.

The lock pin 7 is received in a recess of a position plate 15 fixed to the base plate 9, so that the lock pin 7 can lock the shift lever 1 in the P position or the R (reverse) position. In order to shift the shift lever 1 from the P or R position to the D (drive) position or the other positions, a driver must push the release button 5. The release button 5, when pushed, lowers the lock pin 7 in a groove formed in the shift lever 1, and releases the lock pin 7 from the recess of the position plate 15. Shifting to the P or R position is performed in the same manner. The position plate 15 is a part of the stationary base structure.

This shift lever structure further has a check mechanism 19 for providing adequate feeling in shifting and positioning the shift lever 1. The check mechanism 19 has a check plate 21 and a spring loaded check ball 23.

The shift lock system 3 for inhibiting the shifting from the park position includes a shift lock member 25 and an actuator. In this example, the shift lock member is a shift lock rotary bush (or bushing) 25, and the actuator is an electromagnetic actuator including a shift lock solenoid 27. The shift lock system 3 further includes a canceling arrangement (or canceling means) 29 of the first example according to the first embodiment of the invention.

Figure 23:
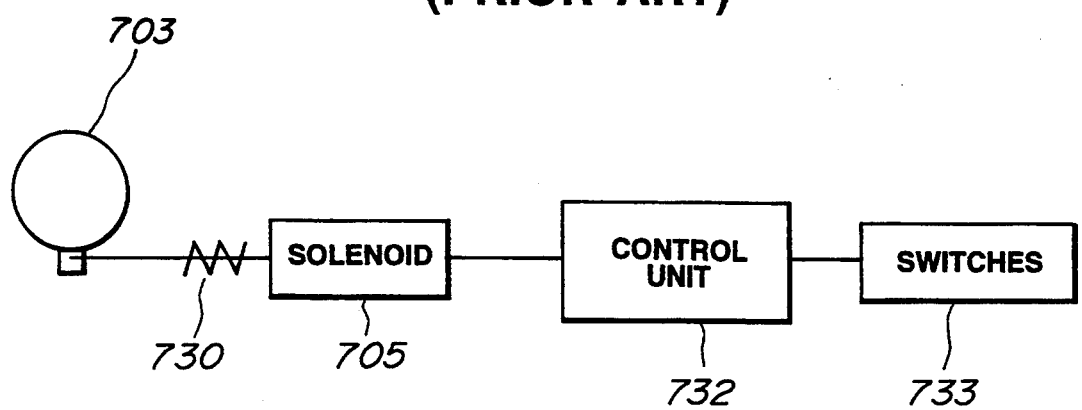
FIG. 23 is a view schematically showing an electrical circuit of a shift lock solenoid of the conventional shift lock system.

The rotary bush 25 is mounted on the shift lever 1 in such a manner that the rotary bush 25 is rotatable, relative to the shift lever 1, between a shift lock angular position for locking the shift lever 1 and an unlock angular position for unlocking the shift lever 1. The rotary bush 25 has an unlock recess (or slit) 25a. The shift lock solenoid 27 is fixed to a motor support bracket 31 fixed to the shift lever 1. The shift lock solenoid 27 has a solenoid rod 27a which is urged outward in a projecting direction by a return spring (corresponding to the spring 730 shown in FIG. 23, and serving as a resilient means). An end of the solenoid rod 27a is connected with a projection 25b of the rotary bush 25. The motor support bracket 31 can be considered to be a part of the shift lever assembly.

A lock lever 33 is swingably mounted on the bracket 31. The lock lever 33 has a first arm 33a for abutting on a stationary stopper 35, and a second arm 33b. When the first arm 33a is apart from the stopper 35, the lock lever 33 rotates by the force of a spring 37 and pushes an abutment wall 25c of the rotary bush 25 in a releasing direction toward the unlock position with the second arm 33b. The stopper 35 can be considered to be a part of the stationary base structure.

The canceling arrangement 29 includes a cancel lever 39 and an operating device 41 for operating the cancel lever 39. The cancel lever 39 is mounted on the shift lever assembly, and arranged to rotate the rotary bush 25 to the unlock position. The operating device 41 is also supported on the shift lever assembly, and arranged to operate the cancel lever 39.

The cancel lever 39 has a cylindrical fulcrum portion 43a, and first and second arms 45 and 47 projecting from the fulcrum portion 43a on the opposite sides. The fulcrum portion 43a of the cancel lever 39 is rotatably supported on a lever support bracket 49 which is fixed to an extension 51 of the motor support bracket 31. The lock lever 33 is also supported rotatably on this extension of the motor support bracket 31. In this example, the lock lever 33 is swingable on a vertical pivot axis, and the cancel lever 39 is swingable on a horizontal pivot axis.

The first arm (or output arm) 45 of the cancel lever 39 extends from the fulcrum portion 43 toward the rotary bush 25, and terminate at a spherical arm end 45a. The second arm (or input arm) 47 extends from the fulcrum portion 43 approximately in the opposite direction to the first arm 45. The second arm 47 has an arm end 53 shaped like a dish.

Application of a downward force onto the dish-like arm end 53 of the second arm 47 causes the cancel lever 39 to rotate about the pivot axis which is substantially horizontal and which passes through the fulcrum portion 43, and raises the spherical arm end 45a of the first arm 45. This upward movement of the arm end 45a causes the rotary bush 25 to rotate to the unlock angular position. The rotary bush 25 has a slant guide 55 for converting the upward movement of the arm end 45a to a rotational movement of the rotary bush 25. The slant guide 55 projects outward from the outside cylindrical surface of the rotary bush 25, and has a downward facing sloping guide surface 55a. The arm end 45a of the first arm 45 is in contact with the sloping guide surface 55a. The rotary bush 25 has a stopper wall 57 formed at the lower end of the sloping guide surface 55a, and a horizontal guide 59 formed under the slant guide 55. The stopper wall 57 extends downward from the lower end of the sloping guide 55 to the horizontal guide 59. The horizontal guide 59 extends from the stopper wall 57 to the above-mentioned abutment wall 25c.

The operating device 41 for pushing down the end 53 of the second arm 47 of the cancel lever 39 is supported on a support (or support portion) 61 of a support member 63. In this example, the support member is a slide panel 63 which moves as a unit with the shift lever 1. The support member (slide panel) 63 is a part of the shift lever assembly. The support 61 of this example is an integral part of the slide panel 63. The support 61 projects downward, and has an upper support section 65 and a lower support section 67. The upper section 65 is larger in cross sectional size than the lower section 67, and there is formed, between the upper and lower sections 65 and 67, an annular step surrounding the upper end of the smaller lower section 67. The support 61 is hollow, and has a support hole extending from an upper end open in the upper surface of the slide panel 63 to a lower end open in the lower end of the support 61. The support hole of the support 61 consists of an upper hollow section 65a formed in the upper support section 65, and a lower hollow section 67a formed in the lower support section 67. The hollow sections 65a and 67a are both shaped like an ellipse or an elongated circle, and there is formed an annular step surface 65b between the upper and lower hollow section 65a and 67a. In the lower end of the lower support section 67, there is formed a recess 68 for preventing rotation.

The operating device 41 includes a cancel rod 69, a fastening means which, in this example, comprises a screw member such as a screw fastener 71, and a plug member 73.

The cancel rod 69 is shaped somewhat like a pencil, and has a cylindrical shank portion, and a cylindrical lower end 69a which is smaller in diameter than the cylindrical shank. The cancel rod 69 further has a rectangular flange (or flanged portion) 75 formed near an upper end 69b of the cancel rod 69 and a tapped hole 77 extending axially from the top end 69b of the cancel rd 69. The tapped hole 77 terminates at a lower end which is closed, and does not reach the lower end 69a. The cancel rod 69 of this example extends substantially vertically along the shift lever 1. The lower end 69a of the cancel rod 69 abuts on the dish-shaped arm end 53 of the cancel lever 39.

The screw fastener 71 has a head 71b and a shank extending from the underside of the head 71b and having a threaded portion 71a. In this illustrated example, the head 71b is formed with a cross recess 71c. The screw head 71b of this example is in the form of a flat countersunk head having a flat circular top surface in which the cross recess 71 is formed, and a conical underside. The screw 71 can be torqued by inserting the tip of a hand tool such as a screwdriver in the recess 71, and turning the tool.

The plug member 73 has an upper section 73a and a lower section 73b. The outer periphery (flanged portion) of the upper section 73a is in the form of an outward flange projecting from the upper end of the lower section 73b. The plug member 73 is formed with a through hole 73c extending from an upper open end 73d opening in the center of the flat top surface of the upper section 73 to a lower end opening in the bottom surface of the lower section 73b. The upper end 73d of the through hole 73c is enlarged in a countersink so as to snugly receive the screw head 71b.

The upper section 73a of the plug member 73 is so shaped that the upper section 73 is fit in the upper hollow section (or recess) 65a of the upper support section 65 of the slide panel 63. The lower section 73b of the plug member 73 is so shaped that the lower section 73b is fit in the lower hollow section 67a of the lower support section 67.

Figure 8:
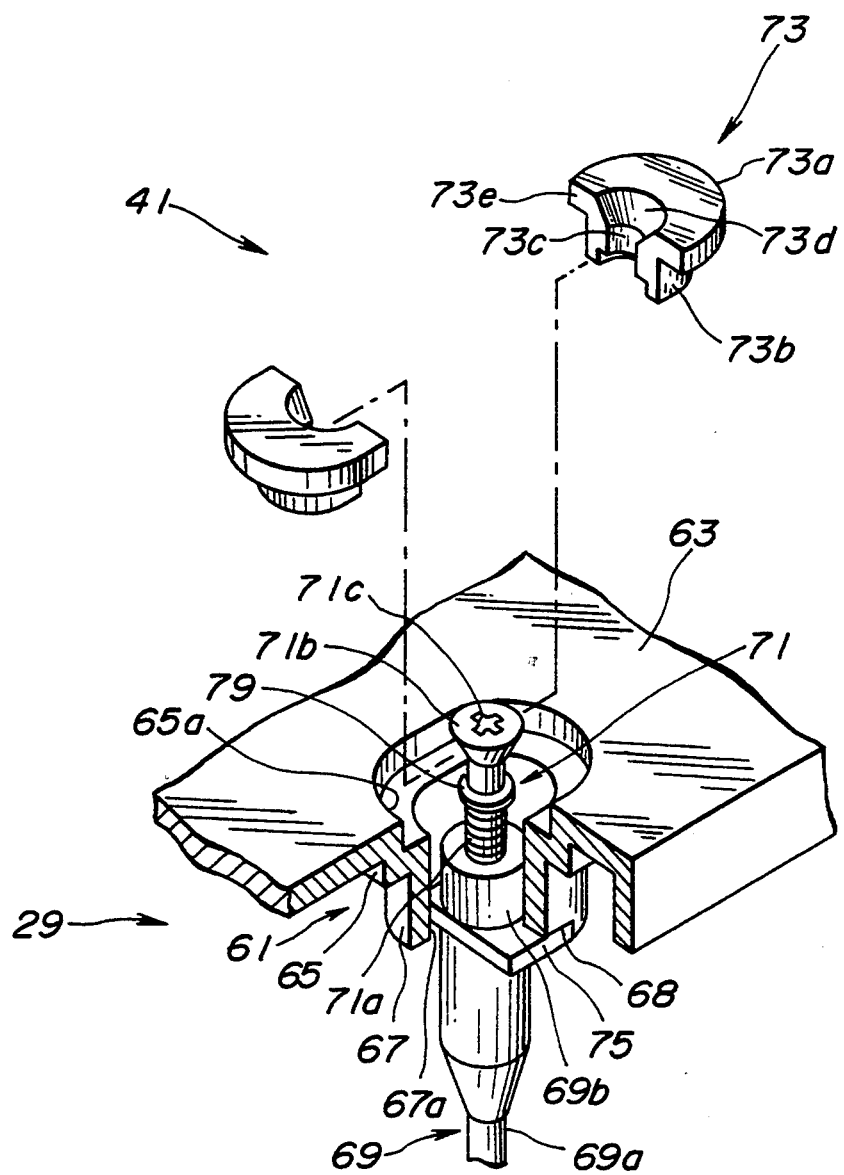

The plug member 73 according to the first example of the first embodiment of the invention is divided into two substantially equal halves by a plane 73e containing the axis of the through hole 73c or the axis of the screw 71 in the assembled state. The plug member 73 is shaped in section like an ellipse, and is divided into the two halved by the plane 73a containing the minor axis of the ellipse. The through hole 73c of the plug member 73 can be split into two semicircular grooves formed in the two halves of the plug member 73, as shown in FIG. 8. This noncircular plug member 73 elongated in one dimension is unrotatable when the plug member 73 is fit in the hollow sections 65a and 67a which are also elliptical. However, it is possible to make the plug member 73 circular or cylindrical, and rotatable in the support 61.

Figure 3:
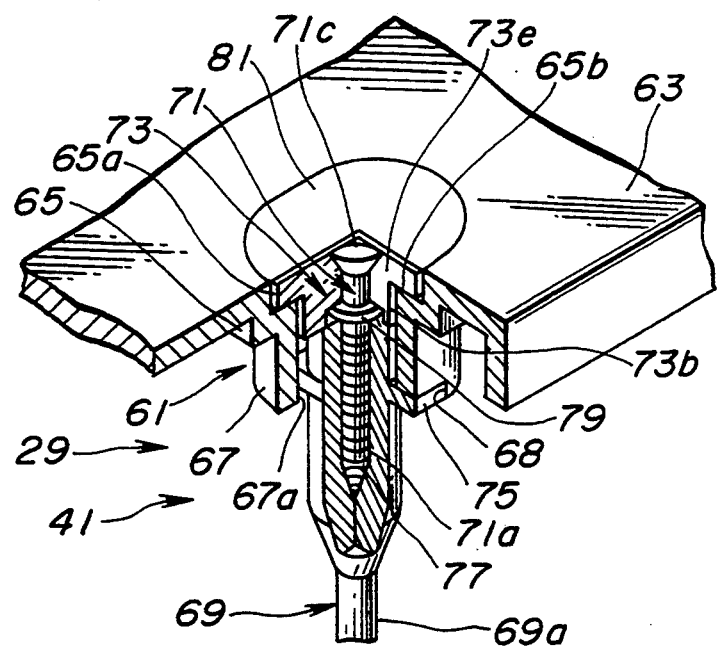
FIG. 3 is an enlarged perspective cutaway view showing a cancel arrangement of a first practical example according to the first embodiment of the invention.
Figure 4:
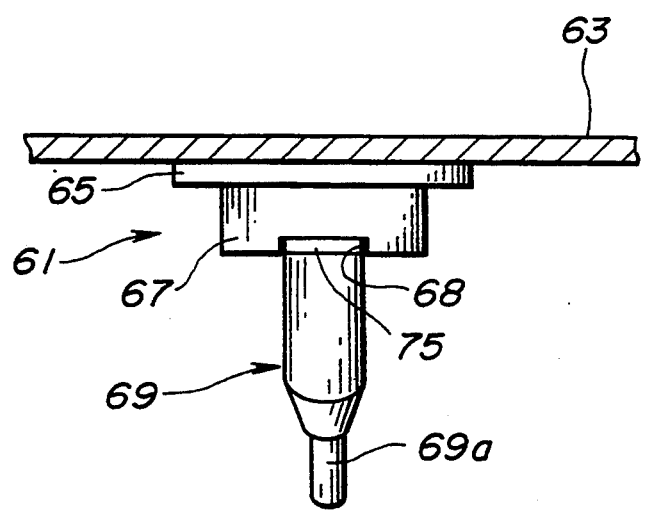
FIG. 4 is a side view of the cancel arrangement shown in FIG. 3.
Figure 5:
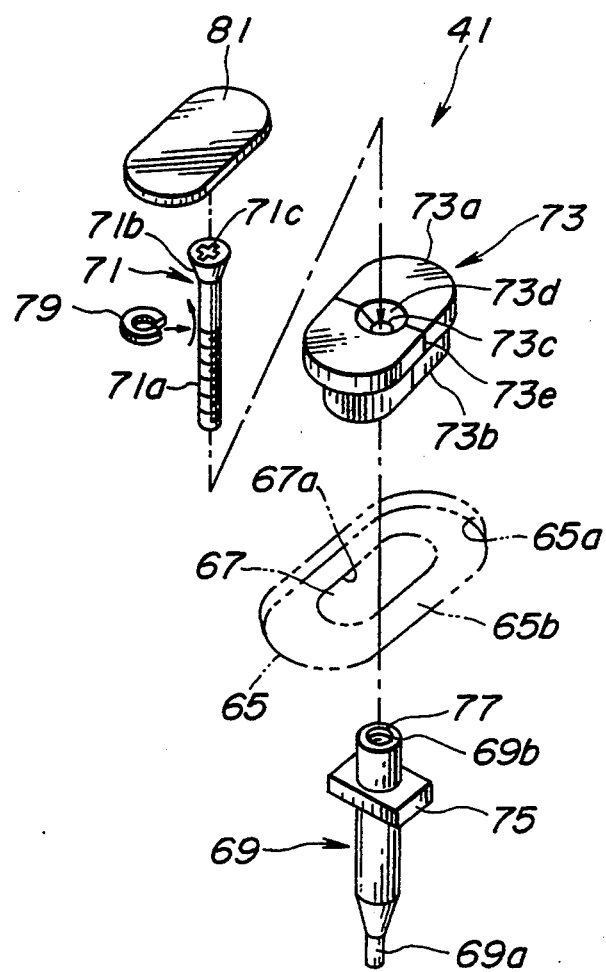
FIG. 5 is an exploded view of the cancel arrangement according to the first example.

In the tightened state shown in FIG. 3, the rotation-preventive rectangular flange 75 of the cancel rod 69 is fit in the recess 68 formed in the lower end of the lower support section 67 of the slide panel (support member) 63. The screw 71 is screwed in the tapped hole 77 of the plug member 73, and fastens the plug member 73 in the support 61 of the slide panel 63. The upper plug section 73a of the plug member 73 is fit in the recess (hollow) 65a of the upper support section 65 of the slide panel (support member) 63, and the outward flange of the upper plug section 73a rests on the upward facing annular step surface 65b which defines the lowest boundary of the recess (hollow) 65a of the upper support section 65. The lower plug section 73b of the plug member 73 is fit in the hollow section 67a of the lower support section 67. The screw 71 and the plug member 73 are rotatable relative to each other. The through hole 73c is so sized and shaped as to allow rotation of the screw fastener 71 in the through hole 73c.

In this way, the fastening means including the screw fastener 71 fastens the plug member 73 and the cancel rod 69 to the support portion 61 of the slide panel (support member) 63. In the tightened state shown in FIG. 3, the lower support section 67 is clamped between the outward flange of the plug member 73, and the rectangular flange 75 of the cancel rod 69 by the tightened screw fastener 71. The fastening means of this example further comprises a retaining means for preventing axial movement of the screw fastener 71 relative to the plug member 73. The retaining means is arranged to prevent the screw fastener 71 from being extracted from the through hole 73c of the plug member, and to limit upward axial movement of the screw fastener 71 relative to the plug member 73. The head 71a of the screw fastener 71 limits downward axial movement of the screw fastener 71 relative to the plug member 73. The retaining means of this example is attached to the shank of the screw fastener 71, and the plug member 73 is confined between the screw head 71a and the retaining means. In this example, the retaining means comprises an E ring 79 which is fit over the screw 71. In the state in which the plug member 73 is fit in the support 61 with the E ring 79, the plug member 73 is immovable in the axial direction relative to the screw 71. The E ring 79 is received in a recess formed in the bottom of the lower plug section 73b of the plug member 73.

A cover 81 is placed on the top surface of the plug member 73 and fit in the cavity of the upper support section 65. The upper surface of the cover 81 is smooth, flush and continuous with the upper surface of the slide panel 63. The cover 81 protects the screw head and improves the appearance of the operating device 41.

The support 61 of the slide panel (support member) 63 moves together with the shift lever 1. The shift lever 1 is movably received in an opening 83a of an indicator panel 83. At least when the shift lever 1 is in the park position, the support 61 is exposed in the opening 83a of the indicator panel 83, to the passenger compartment. The indicator panel 83 is a part of the stationary base structure.

The shift lock system 3 according to the first example of the first embodiment of the invention is operated as follows.

When the shift lever 1 is in the park position, the rotary bush 25 is in a lock position in which the recess 25a is out of alignment with the lock pin 7. The driver cannot push the release button 5 of the shift lever 1, and cannot move the shift lever 1 from the park position.

When the key switch (or ignition switch, or vehicle's main combination switch) of the vehicle is in the on position, and the brake pedal of the vehicle is depressed, a control unit (which may includes an onboard microcomputer) judges that predetermined unlock conditions are satisfied, and energizes the shift lock solenoid 27. The solenoid 27 pulls the solenoid rod 27a and rotates the rotary bush 25 from the lock angular position to the unlock angular position in which the recess 25a is located just below the lock pin 7. Now, the driver can push the release button 5, and shift the shift lever 1 from the park position to the drive position or some other position.

When the shift lever 1 is away from the park position, the lock lever 33 is apart from the stopper wall 35. Therefore, the lock lever 33 pushes the abutment wall 25c of the rotary bush 25 with the arm 33b, and holds the rotary bush 25 in the unlock position. When a detent switch turns on and the shift lock solenoid 27 is deenergized, the lock lever 33 holds the rotary bush 25 in the unlock position, and allows the driver to shift the shift lever 1.

If a failure in the electrical system makes it impossible to energize the shift lock solenoid 27, then the shift lever 1 is locked immovable in the park position, and the driver is unable to drive the car. In this case, the shift lock system 3 according to this example of the invention allows the following unlocking operations.

Figure 6:
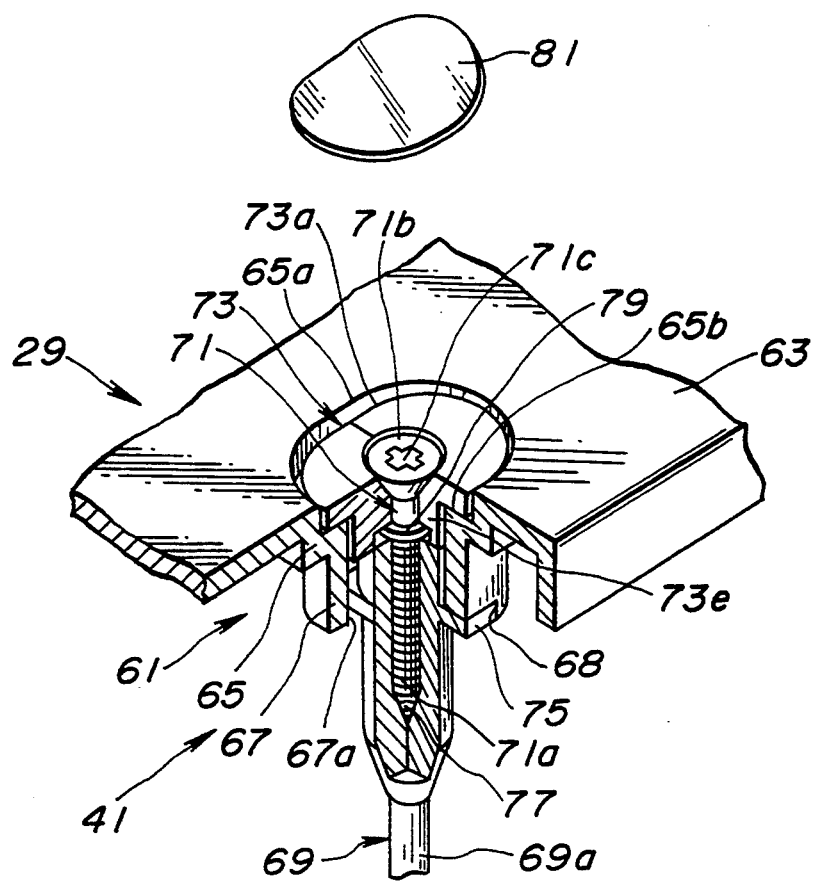
FIGS 6, 7 and 8 are views showing the cancel arrangement according to the first example in various states.

As shown in FIG. 6, the cover 81 is removed to expose the screw head 71b.

Figure 7:
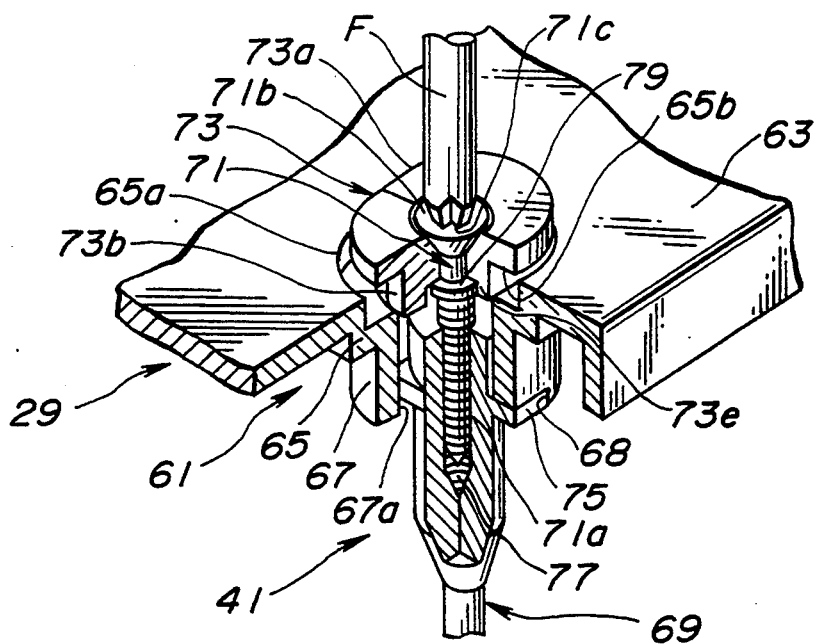

As shown in FIG. 7, the screw 71 is unscrewed with a tool F having a tip conformable to the cross recess 71c. During this, the rectangular flange 75 prevents the cancel rod 69 from rotation by engaging with the recess 68. Therefore, the screw 71 moves upward, and the plug member 73 moves upward together with the screw 71. The screw 71 is untightened and the plug member 73 is moved up until the plug member 73 becomes free from the constraint of the upper and lower support sections 65 and 67. When the plug member 73 is raised enough, the plug member 73 is divided and removed from the screw 71 which is still in engagement with the cancel rod 69, as shown in FIG. 8.

After removal of the plug member 73, the screw 71 is pushed down with the tool F. The cancel rod 69 moves down together with the screw 71 until the lower end of the cancel rod 69 pushes down the disk-shaped arm end 53 of the cancel lever 39. The input arm 47 of the cancel lever 39 moves down receiving the downward force on the disk-shaped end 53, the cancel lever 39 swings about the fulcrum 43, and the output arm 45 moves up. Therefore, the spherical arm end 45a of the output arm 45 pushes up the slant guide 55 of the rotary bush 25, and the spherical end 45a slides along the sloping guide surface 55a, and causes the rotary bush 25 to rotate until the unlock angular position is reached, and the shifting from the park position is allowed again.

When the cancel rod is set free from the push of the tool F, the solenoid rod 27a thrusts out by the force of the return spring, and returns the rotary bush 25 to the lock position. Therefore, the cancel lever 39 swings in the reverse direction, and pushes up the cancel rod 69 with the dish-shaped arm end 53. The cancel rod 69 is moved upward by the dish-shaped arm end 53 of the cancel lever 39 until the flange 75 of the cancel rod 69 is received in the recess 68 of the support section 67. In this state, the plug member 73 can be attached to the screw fastener 71 again as shown in FIG. 7. Therefore, it is possible to fasten the plug member 73 and the cancel rod 69 to the support 61 again by tightening the screw fastener 71. Finally, the screw head 71b and the plug member 73 are covered with the cover 81, and the operating device 41 is restored to the original tightened state shown in FIG. 3.

The shift lock system of this example makes it unfeasible to cancel the shift lock without tools. This canceling arrangement is impervious to tampering and inadvertence.

Figure 2:
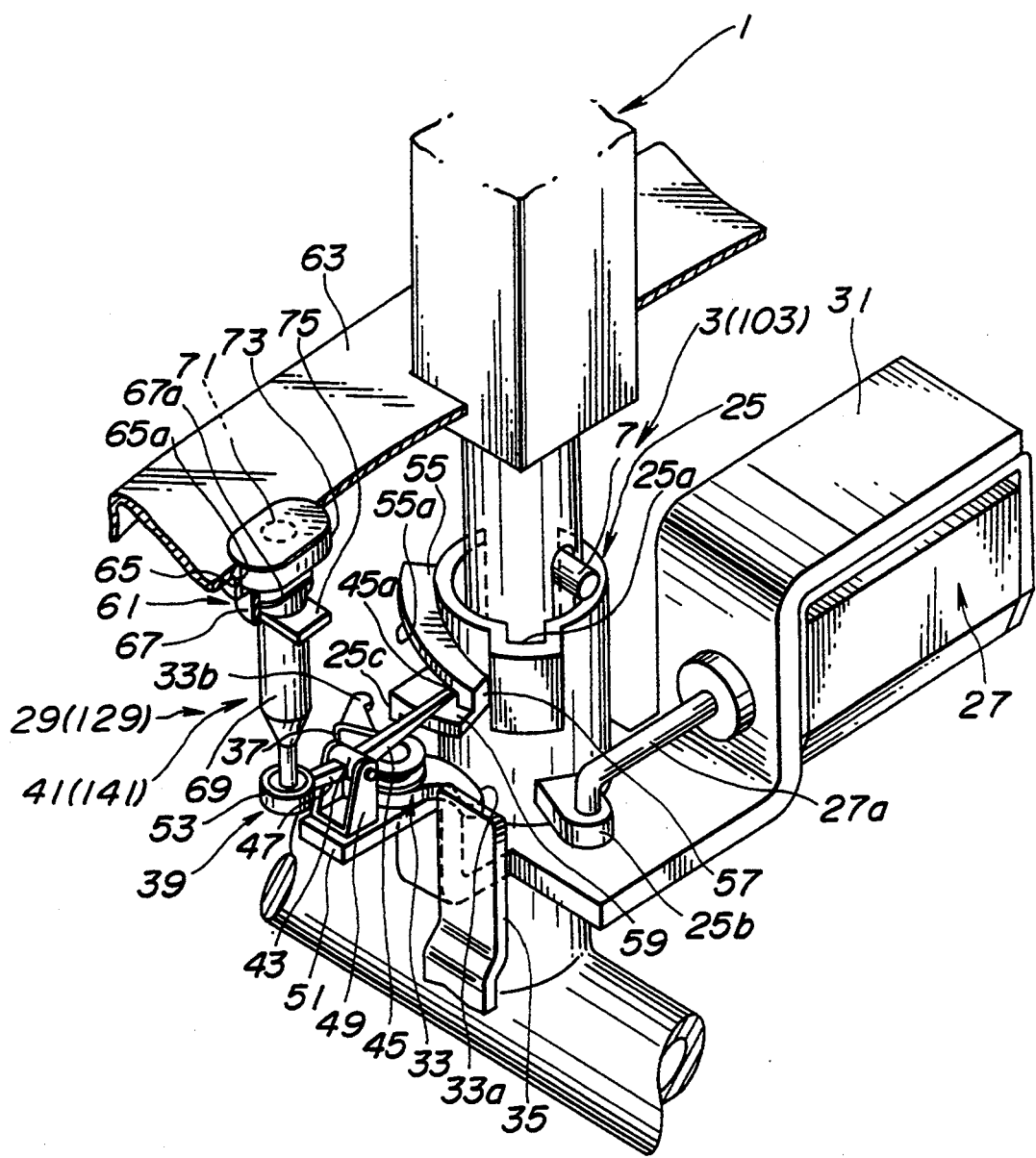
FIG. 2 is an enlarged perspective view showing the shift lock system shown in FIG. 1, partly in a cutaway.

FIGS. 1, 2 and 9~15 show a shift lock system 103 according to a second example of the first embodiment of the preset invention. The shift lock system 103 is almost the same as the shift lock system 3 according to the first embodiment, and FIGS. 1 and 2 are common to the shift lock systems 3 and 103. Different features reside only in an operating device 141 of a canceling arrangement 129, and specifically in a plug member 173.

The canceling arrangement 129 according to the second example includes the operating device 141 according to the second example and a cancel lever 39 which is identical to that of the shift lock system 3 according to the first example.

The operating device 141 for pushing down the end 53 of the second arm 47 of the cancel lever 39 is supported on a support 61 of a slide panel (support member) 63 which moves as a unit with the shift lever 1, as in the canceling arrangement 29 of the first example. The support 61 is an integral port of the slide panel 63. The support 61 projects downward, and has an upper support section 65 and a lower support section 67. The upper section 65 is larger in size than the lower section 67, and there is formed, between the upper and lower sections 65 and 67, an annular step surrounding the upper end of the smaller lower section 67. The support 61 is hollow, and has a support hole consisting of an upper hollow section 65a formed in the upper section 65, and a lower hollow section 67a formed in the lower section 67. The hollow sections 65a and 67a are both shaped like an ellipse or an elongated circle, and there is formed an elliptical step surface between he upper and lower hollow sections 65a and 67a.

The operating device 141 includes the above-mentioned plug member 173, a cancel rod 69 and a screw fastener 71. The cancel rod 69 and the screw fastener 71 are identical to those of the operating device 41 according to the first example.

The plug member 173 has an upper section 173a and a lower section 173b. The outer periphery of the upper section 173a is in the form of a flange projecting from the upper end of the lower section 173b. The plug member 173 is formed with a through hole 173e extending from an upper open end 173f opening in the center of the flat top surface of the upper plug section 173 to a lower end opening in the bottom surface of the lower plug section 173b. The upper end 173f of the through hole 173e is enlarged in a countersink so as to snugly receive the screw head 171b.

The upper section 173a of the plug member 173 is so shaped that the upper section 173 is fit in the cavity 65 of the upper support section 65 of the slide panel 63. The lower section 173b of the plug member 173 is so shaped that the lower section 173b is fit in the cavity 67a of the lower support section 67.

Figure 11:
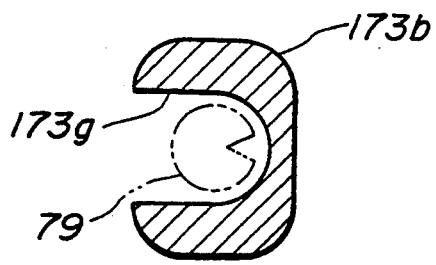
FIG. 11 is a sectional view taken across a line XII—XII in FIG. 10.

The plug member 173 according to the second example further has a pair of legs 173c projecting downward from the lower end of the lower section 173b. A claw 173d is formed in the lower end of each leg 173c. As shown in FIG. 11, a groove 173g for receiving the E ring 79 is formed in the side surface of the lower section 173b of the plug member 173. In this example, the legs 173c are arranged symmetrically with respect to an imaginary plane which contains the minor axis of the elliptical shape of the plug member and which further contains the axis of the cancel rod 69 and is parallel to the parallel longer sides of the rectangular flange 75.

Figure 9:
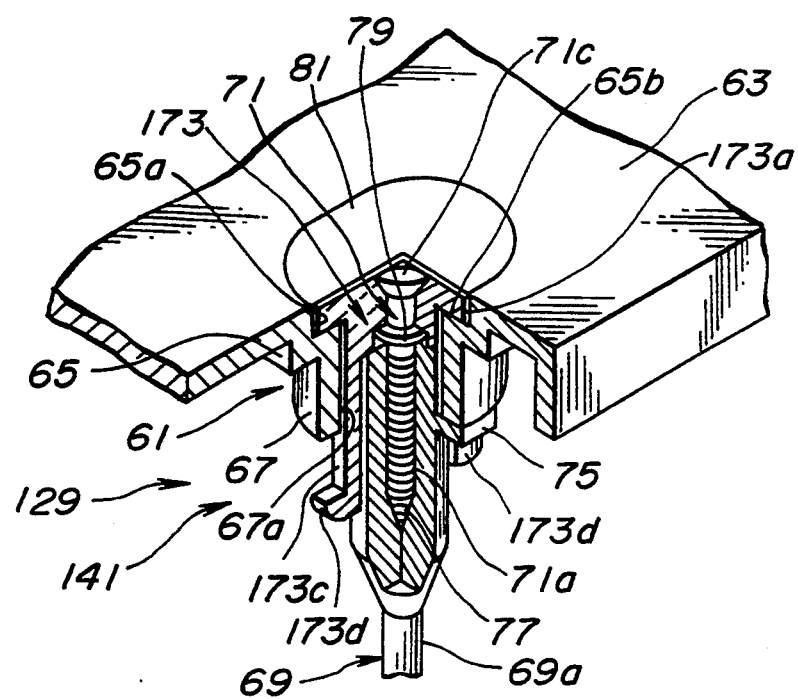
FIG. 9 is an enlarged perspective cutaway view showing a cancel arrangement of a second practical example according to the first embodiment of the present invention.
Figure 10:
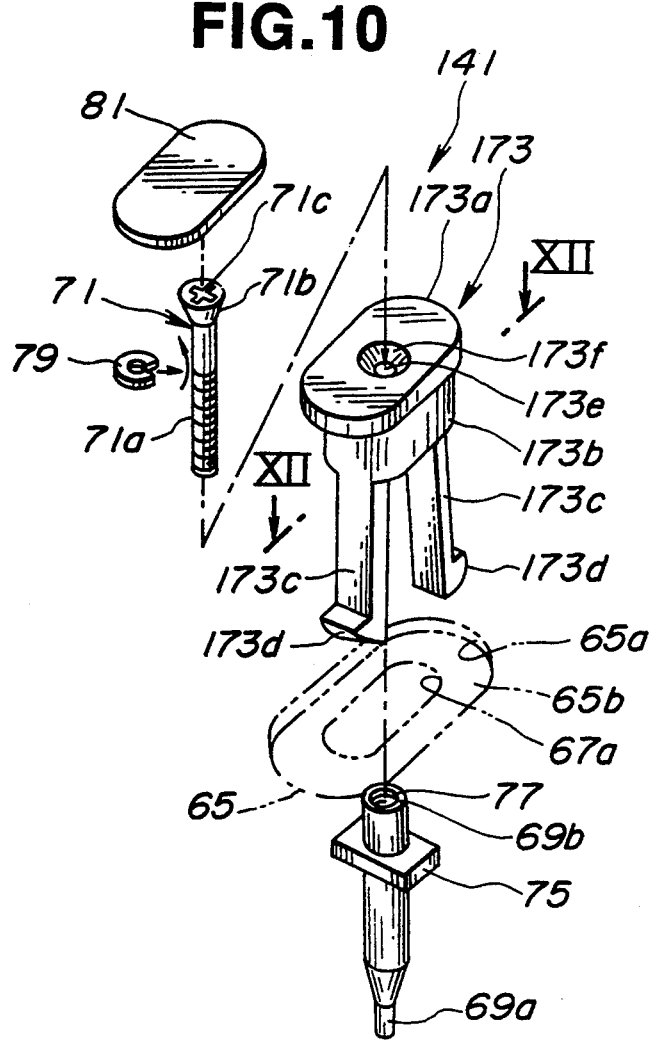
FIG. 10 is an exploded view of the cancel arrangement according to the second example.

In the state shown in FIG. 9, the flange 75 of the cancel rod 69 abuts against the lower end of the lower support section 67. The claw 173d of each leg 173c is at a predetermined distance apart from the lower end of the lower support section 67. The screw 71 and the plug member 173 are rotatable relative to each other. The E ring 79 is fit over the screw 71, and placed between the plug member 173 and the upper end of the cancel rod 69. The plug member 173 is immovable in the axial direction relative to the screw 71.

If a trouble in the electrical system makes it impossible to energize the shift lock solenoid 27, then the shift lever 1 is locked immovable in the park position, and the driver is unable to drive the car. In this case, the shift lock system 103 according to this example of the invention allows the following unlocking operations.

Figure 12:
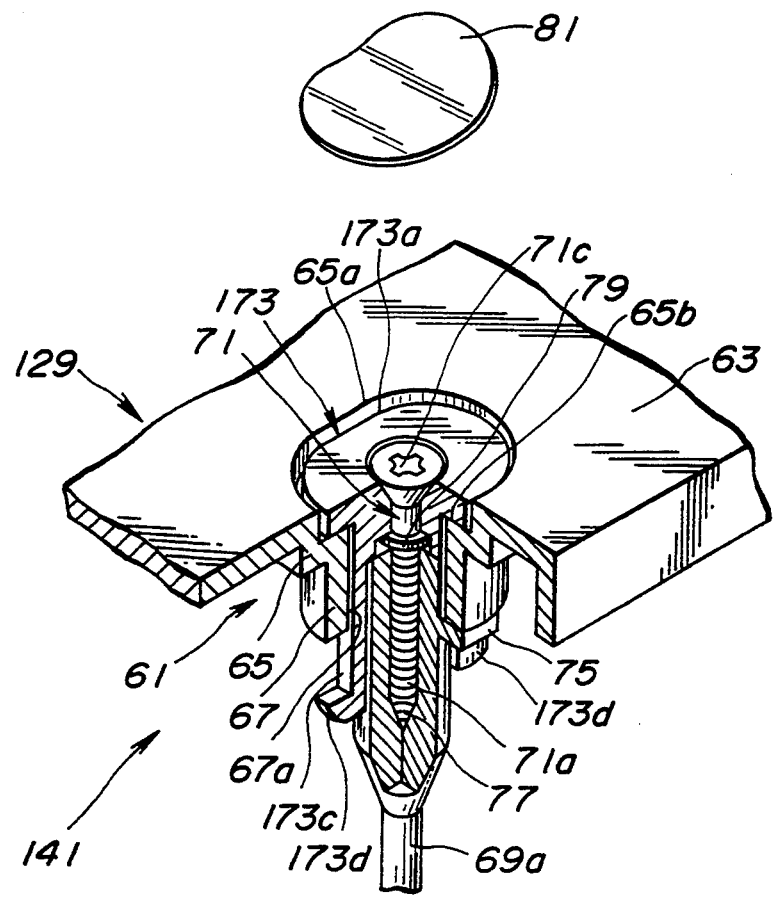
FIGS. 12, 13, 14 and 15 are views showing the cancel arrangement according to the second example in various states.

As shown in FIG. 12, the cover 81 is removed to expose the screw head 71b.

Figure 13:
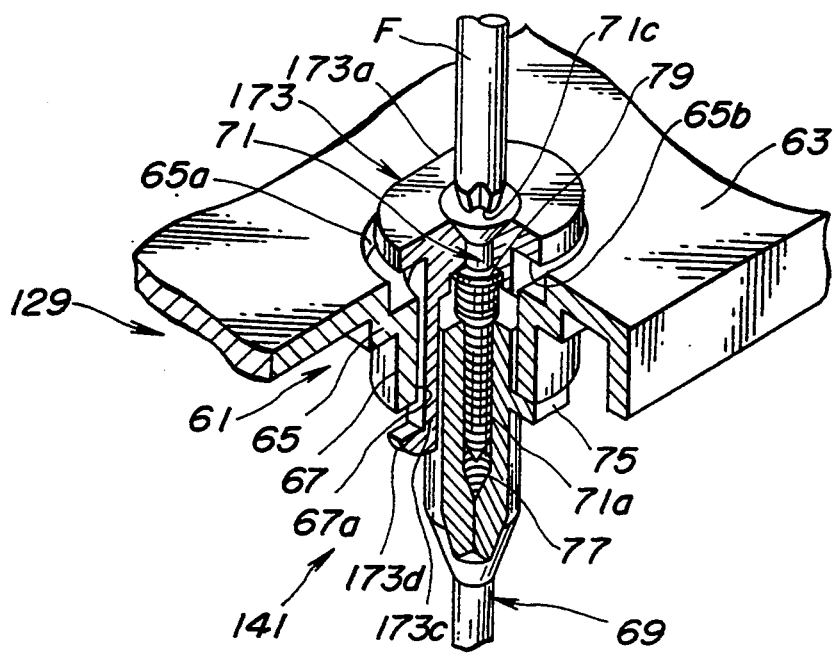
Figure 14:
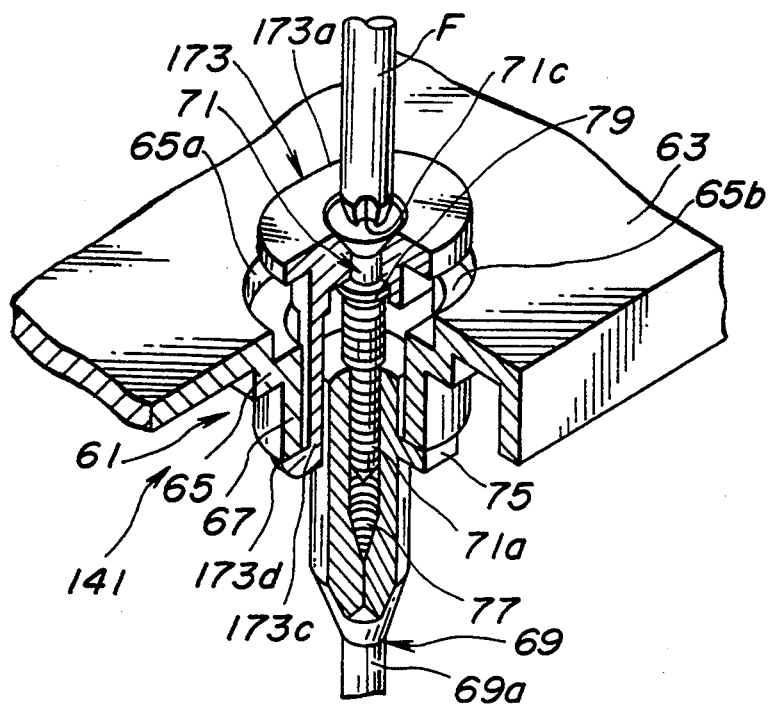
Figure 15:
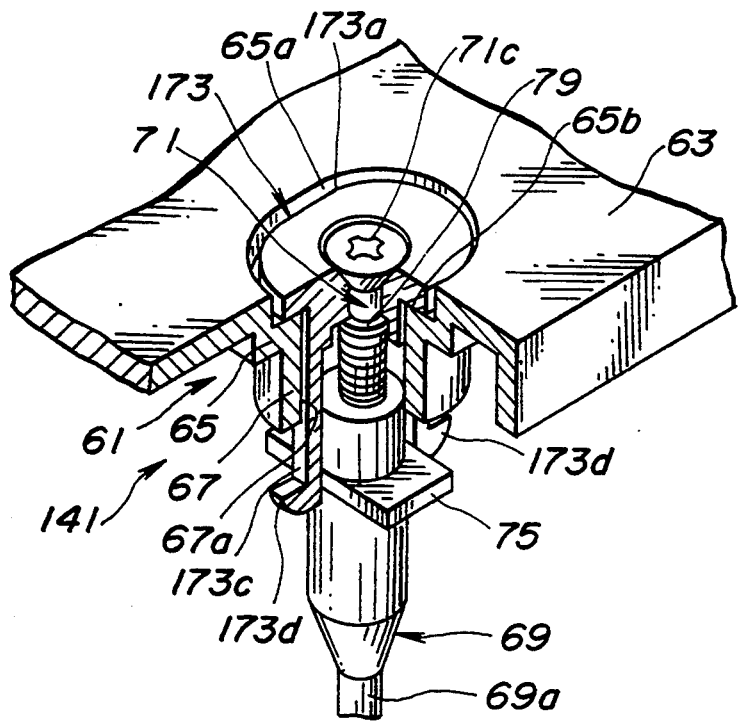

As shown in FIG. 13, the screw 71 is unscrewed with a tool F having a tip conformable to the cross recess 71c. Therefore, the screw 71 moves upward, and the plug member 173 moves upward together with the screw 71. The screw 71 is untightened and the plug member 173 is moved up until the claws 173d of the legs 173c of the plug member 173 reach the lower end of the lower support section 67 as shown in FIG. 14. In the state shown in FIG. 14, the threaded portion of the screw 71 is still in the tapped hole 77 of the cancel rod 69, as shown in FIG. 14.

After the plug member 173 has been moved up sufficiently, the screw 71 is pushed down with the tool F, or the plug member 173 is pushed down by a finger. The cancel rod 69 moves down together with the screw 71 and the plug member 173 until the lower end of the cancel rod 69 pushes down the disk-shaped arm end 53 of the cancel lever 39. The input arm 47 moves down receiving the downward force on the disk-shaped end 53, the cancel lever 39 swings about the fulcrum 43, and the output arm 45 moves up. Therefore, the spherical arm end 45a of the output arm 45 pushes up the slant guide 55 of the rotary bush 25, and the spherical end 45a slides along the sloping guide surface 55a, and causes the rotary bush 25 to rotate until the unlock angular position is reached, and the shifting from the park position is allowed again.

When the cancel rod 69 is set free from the push of the tool F or the finger, the solenoid rod 27a thrusts out by the force of the return spring, and returns the rotary bush 25 to the lock position. Therefore, the cancel lever 39 swings in the reverse direction, and pushes up the cancel rod 69 with the dish-shaped arm end 53. The cancel rod 69 is moved upward by the dish-shaped arm end 53 of the cancel lever 39 until the flange 75 of the cancel rod 69 and the claws 173d of the plug member 173 abut against the lower end of the lower support section 67. In this state, it is possible to fasten the plug member 173 and the cancel rod 69 to the support 61 again by tightening the screw fastener 71 with the tool F. Finally, the screw head 71b and the plug member 73 are covered with the cover 81, and the operating device 141 is restored to the original tightened state shown in FIG. 9.

The retaining means may comprise a retaining ring and a shoulder or an outward flange which is formed in the shank of the screw fastener and which has an annular shoulder surface facing toward the screw head and limiting axial movement of the retaining ring mounted on the shank of the screw fastener between the screw head and the shoulder surface, by abutting against the retaining ring. For example, the shank of the screw fastener consists of a lower threaded portion and an upper unthreaded portion which is reduced in diameter as compared with the lower threaded portion so as to form the annular shoulder surface. The retaining ring is not completely closed, but it has a narrow ring gap. Once the retaining ring is mounted on the upper unthreaded shank portion between the head and the shoulder surface, the retaining ring does not drop off the screw fastener.

Figure 16:
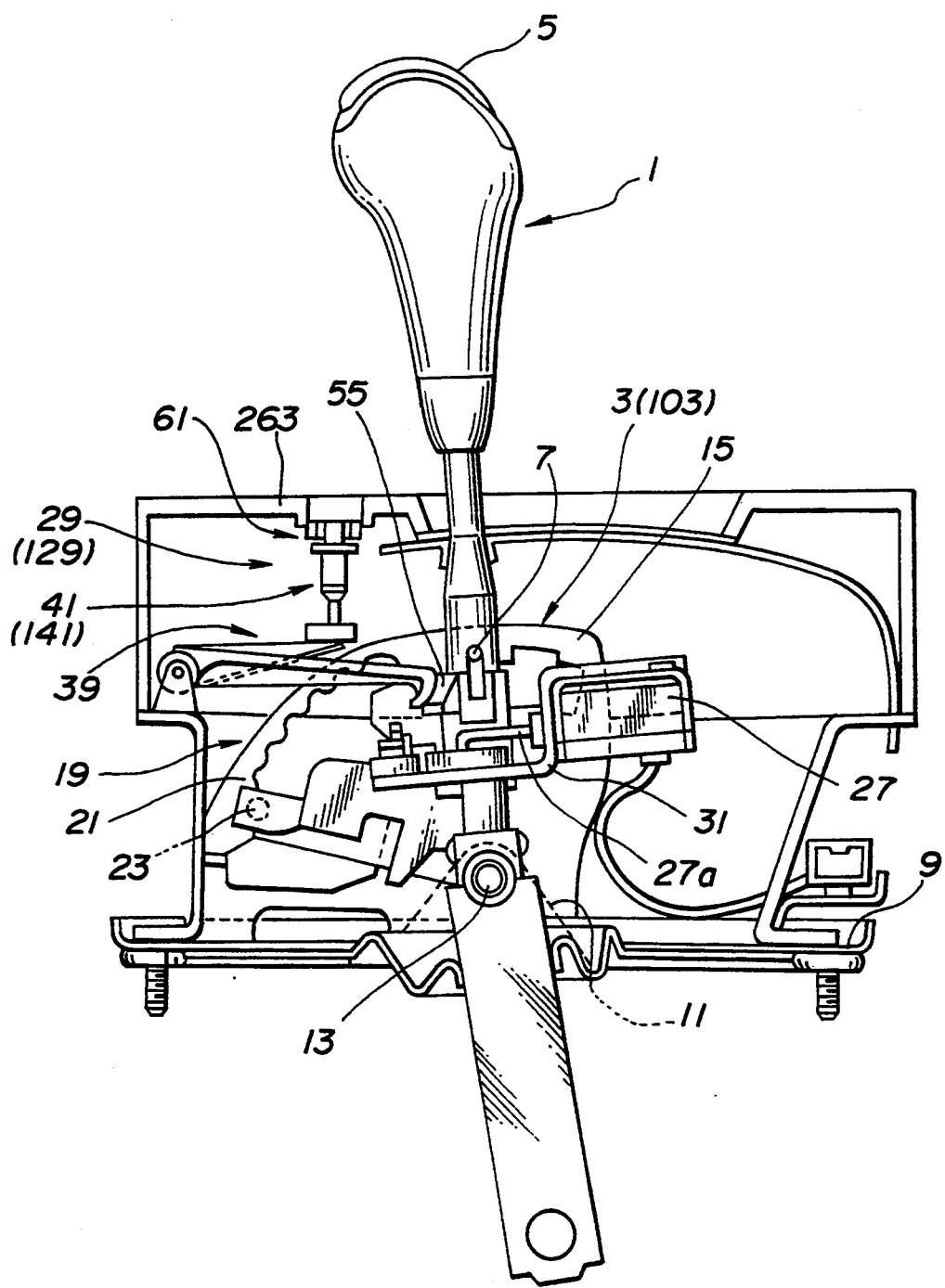
FIG. 16 is a sectional view showing a shift lock system according to a second embodiment of the present invention.
Figure 17:
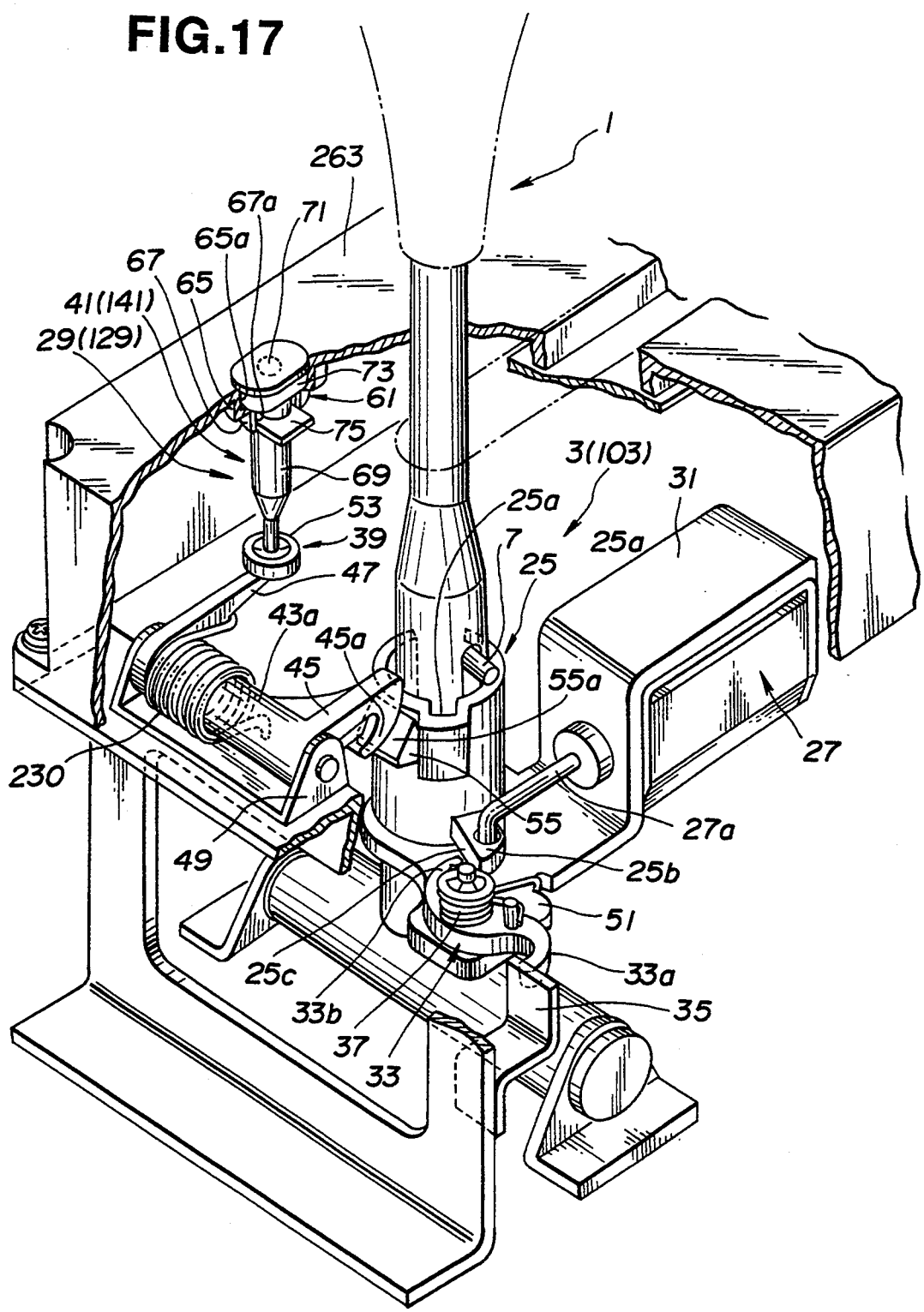
FIG. 17 is an enlarged perspective view showing the shift lock system shown in FIG. 16, partly in a cutaway.

FIGS. 16 and 17 show a second embodiment of the present invention. A shift lever assembly of the second embodiment is movably mounted on a stationary base structure, and a shift lock member in the form a rotary bush 25 is mounted on the shift lever assembly in the same manner as in the first embodiment shown in FIGS. 1 and 2. However, a canceling arrangement 29 or 129 in the second embodiment is mounted on the stationary base structure as shown in FIGS. 16 and 17 whereas the canceling arrangement in the first embodiment is mounted on the swingable shift lever 1, as shown in FIGS. 1 and 2. In a first practical example according to the second embodiment, the canceling arrangement 29 includes an operating device 41 which is substantially identical to the operating device 41 shown in FIGS. 3–8. In a second practical example according to the second embodiment, the canceling arrangement 129 includes an operating device 141 which is substantially identical to the operating device 141 shown in FIGS. 9–15. The canceling arrangement 29 or 129 in each of the first and second examples of the second embodiment further includes a cancel lever 39. In either case, the operating device 41 or 141 and the cancel lever 39 according to the second embodiment are both mounted on the stationary base structure, unlike the first embodiment.

The operating device 41 or 141 according to the second embodiment is supported on a support (or support portion) 61 of a stationary support member 263. The stationary support member 263 of the second embodiment is a part of the stationary base structure as shown in FIGS. 16 and 17. The support member 263 is fixed stationary to the vehicle body through the base structure. The support 61 of the support member 263 has upper and lower support sections 65 and 67 which are substantially identical to the upper and lower support sections 65 and 67 shown in FIGS. 1–15.

The cancel lever 39 shown in FIGS. 16 and 17 has a cylindrical fulcrum portion 43a, and first and second arms 45 and 47 projecting from the fulcrum portion 43a on the same side. The fulcrum portion 43a of the cancel lever 39 is rotatably supported on a lever support bracket 49 which is fixed to the stationary base structure. A lock lever 33 is supported rotatably on an extension 51 of a motor support bracket 31 fixed to the shift lever assembly. That is, the lock member 25, the lock lever 33 and a shift lock solenoid 27 are mounted on the shift lever assembly as in the first embodiment. The lock lever 33 is swingable on a vertical pivot axis which is substantially parallel to the axis of the rotary bush 25. The cancel lever 39 is swingable on a stationary horizontal pivot axis.

The first arm (or output arm) 45 of the cancel lever 39 extends from the fulcrum portion 43 toward the rotary bush 25, and terminate at an arm end having an arched finger 45a projecting downwards. The second arm (or input arm) 47 extends from the fulcrum portion 43 roughly in parallel to the first arm 45. The first and second arms 45 and 47 are spaced apart from each other along the axial direction of the fulcrum portion 43a, as shown in FIG. 17. The second arm 47 has an arm end 53 shaped like a dish.

Application of a downward force onto the dish-like arm end 53 of the second arm 47 causes the cancel lever 39 to rotate about the pivot axis which is substantially horizontal and which passes through the fulcrum portion 43, and lowers the arm end 45a of the first arm 45. This downward movement of the arm end 45a causes the rotary bush 25 to rotate to the unlock angular position. The rotary bush 25 has a slant guide 55 for converting the downward movement of the arm end 45a to a rotational movement of the rotary bush 25. The slant guide 55 projects outward from the outside cylindrical surface of the rotary bush 25, and has a sloping guide surface 55a. The arm end 45a of the first arm 45 is in contact with the sloping guide surface 55a when the shift lever 1 is in the position shown in FIG. 17. The arm end 45a and the sloping guide surface 55a are so shaped and arranged that the rotary bush 25 can be rotated to the unlock position by the cancel lever 39. The sloping guide surface 55a is offset relative to the axis of the shift lever 1, and does not face toward the center.

A spring 230 is mounted on the cylindrical fulcrum portion 43a of the cancel lever 39. One end of the spring 230 is retained by the second arm 47 of the cancel lever 39, and the other spring end is retained by the bracket 49. The second arm 47 of the cancel lever 39 is urged upward by the spring 230.

Like the first embodiment, the lock lever 33 shown in FIG. 17 has a first arm 33a for abutting on a stationary stopper 35 fixed to the stationary base structure, and a second arm 33b for pushing an abutment wall 25c. As shown in FIG. 17, the abutment wall 25c is formed in a projection 25b of the rotary bush 25 which is connected with the solenoid rod 27a of the shift lock solenoid 27.

What is claimed is:

1. A shift lock system comprising:
   a shift lock rotary bush rotatable between a lock position for locking a shift level of an automatic transmission and an unlock position for unlocking the shift lever;
   an electromagnetic actuator for driving said rotary bush from the lock position to the unlock position;
   a cancel lever for rotating the rotary bush from the lock position to the unlock position;
   a support member;
   a cancel rod which is supported and positioned at a predetermined position by said support member in such a manner that said cancel rod is movable in a second direction from said predetermined position, and which causes said cancel lever to rotate the rotary bush from the lock position to the unlock position when said cancel rod moves in said second direction from said predetermined position, said cancel rod being unrotatable when said cancel rod is in said predetermined position;

a screw member which is screwed into said cancel rod and which moves in a first direction opposite to said second direction when said screw member is unscrewed; and a plug member which is supported on said support member in such a manner that said plug member is movable in said first direction and which is attached to said screw member in such a manner that said screw member is rotatable relative to said plug member, and that said plug member is immovable relative to said screw member in an axial direction of said screw member, said plug member being fastened to said support member by said screw member.

2. A shift lock system according to claim 1 wherein said rotary bush and said electromagnetic actuators are mounted on the shift lever; said cancel rod comprises a tapped hole and a flanged portion; said screw member comprises a screw fastener comprising a head adapted to be torqued by a tool and a shank which extends from said head in said second direction and which has a threaded portion screwed into said tapped hole of said cancel rod; said plug member comprises a flanged portion, and a through hole in which said shank of said screw fastener is rotatably received; said support member comprises a first support section facing in said first direction and receiving said flanged portion of said plug member in such a manner that said first support section allows said plug member to move in said first direction but prevents said plug member to move in said second direction, and a second support section facing in said second direction and receiving said flanged portion of said cancel rod in such a manner that said second support section prevents said cancel rod from rotating and from moving in said first direction, and allows said cancel rod to move in said second direction; and said screw member further comprises a retaining means for preventing said screw fastener from being extracted from said plug member; and wherein said shift lock system further comprises a stationary base structure on which said shift lever is movably supported; and said support member and said cancel lever are mounted on one of said shift lever and said base structure.

3. A shift lock system according to claim 2 further comprising a return spring for urging said rotary bush toward said lock position.

4. A shift lock system according to claim 3 further comprising a cover for covering said head of said screw fastener and said plug member.

5. A shift lock system according to claim 2 wherein said plug member comprises two half members which are fit in a recess formed in said first support section of said support member, and each of said half members comprises a semicircular groove defining a half of said through hole of said plug member.

6. A shift lock system according to claim 2 wherein said plug member comprises legs each of which extends in said second direction along said cancel rod and has a claw for limiting movement of said plug member in said first direction by abutting on an end of said second support section.

7. A shift lock system for an automatic transmission of a vehicle, comprising:

a shift lever mechanism which comprises a stationary base structure, and a shift lever assembly movably supported on said base structure, said shift lever mechanism comprising a support member;

a shift locking means for locking said shift lever assembly in a parking position and unlocking said shift lever assembly, said shift locking means comprising a shift lock member movable between a lock position for locking said shift lever assembly in the parking position and an unlock position for unlocking said shift lever assembly, and an actuating means for causing said shift lock member to move between said lock and unlock positions, said shift lock member being held in said lock position when said actuating means is in a lock state, and in said unlock position when said actuating means in an unlock state; and a canceling means for moving said shift lock member from the lock position to the unlock position even when said actuating means is in said lock state, said canceling means comprises a cancel lever for moving said shift lock member from said lock position to said unlock position, a cancel rod for causing said cancel lever to move said shift lock member from said lock position to said unlock position, a plug member and a fastening means for fastening said cancel rod and said plug member to said support member, said cancel rod comprising a tapped hole and a flanged portion, said plug member comprising a flanged portion and a through hole, said fastening means comprising a screw fastener which comprises a head and a shank passing through said through hole of said plug member and comprising a threaded portion screwed into said tapped hole of said cancel rod;

wherein said support member comprises a support portion which defines a support hole extending from a first open end to a second open end and receiving said cancel rod and said plug member, and which comprises a first support section defining said first open end and comprising a first recess receiving said flanged portion of said plug member and a second support section defining said second open end and comprising a second recess for receiving said flanged portion of said cancel rod and preventing rotation of said cancel rod.

8. A shift lock system according to claim 7 wherein said fastening means of said canceling means further comprises a retaining means for preventing said screw fastener from being extracted from said plug member, said plug member being placed between said head of said screw fastener and said retaining means so that axial movement of said screw fastener relative to said plug member is limited in one axial direction by said head of said screw fastener and in the other axial direction by said retaining means.

9. A shift lock system according to claim 8 wherein said retaining means comprises a retaining ring which is mounted on said shank of said screw fastener; said plug member is placed between said head of said screw fastener and said retaining ring and said retaining ring is place between said plug member and said cancel rod.

10. A shift lock system according to claim 7 wherein said first recess opens in a first direction; said second recess opens in a second direction opposite to the first direction; said cancel rod extends in the second direction from a first rod end to a second rod end for operating said cancel rod; said tapped hole opens in said first rod end, and extends from said first rod end toward said second rod end; said shank of said screw fastener extends in the second direction from said head; said first support section comprises a shoulder surface facing in said first direction and abutting against said flanged portion of said plug member; and said second support section comprises a shoulder surface facing in said second direction and abutting against said flanged portion of said cancel rod, and a side wall surface for preventing rotation of said cancel rod by abutting against said flanged portion of said cancel rod.

11. A shift lock system according to claim 10 wherein said fastening means fastens said plug member and said cancel rod to said support portion and clamps said support portion between said flanged portions of said plug member and said cancel rod when said screw fastener is in a tightened state in which said screw fastener is tightened into said tapped hole of said cancel rod, and said fastening means moves said plug member in the first direction away from the cancel rod when said screw fastener is unscrewed.

12. A shift lock system according to claim 11 wherein said shift lock system further comprises a resilient means for urging said shift lock member toward the lock position and for urging said cancel lever toward an inoperative position, and said cancel lever comprises a first arm having a first arm end for operating said shift lock member and a second arm having a second arm end for pushing said second rod end of said cancel rod in the first direction when said cancel rod is urged toward said inoperative position by said resilient means.

13. A shift lock system according to claim 12 wherein said canceling means further comprises a cover for covering said head of said screw fastener and said plug member; said plug member comprises a first surface facing in said first direction; a first end of said through hole of said plug member is open in said first surface of said plug member and enlarged to receive said head of said screw fastener; and said cover is placed on said first surface of said plug member and fit in said recess of said first support section.

14. A shift lock system according to claim 13 wherein said support member comprises an upper surface facing in said first direction which is an upward direction, and a lower surface facing in said second direction which is a downward direction; said support portion project downward from said lower surface; said cancel lever is placed below said cancel rod, and is swingable on a pivot axis which is substantially parallel to an imaginary plane to which a longitudinal direction of the shift lever is perpendicular.

15. A shift lock system according to claim 14 wherein said shift lock member is a rotary bush which is mounted on said shift lever, which is rotatable between the lock and unlock positions, and which is formed with a downward facing slant guide surface abutting against said first arm end of said cancel lever.

16. A shift lock system according to claim 15 wherein said actuating means comprises a shift lock solenoid which moves said rotary bush from the lock position to the unlock position when said shift lock solenoid is energized; and said shift lock system further comprises a controlling means for energizing said shift lock solenoid when a brake of the vehicle is applied.

17. A shift lock system according to claim 16 wherein said controlling means comprises a sensing means for sensing operating conditions of the vehicle, and a control unit for energizing said shift lock solenoid when a brake pedal of the vehicle is depressed, a key switch of the vehicle is in an on position, and the shift lever is in the parking position.

18. A shift lock system according to claim 11 wherein said plug member comprises a first plug section which is fit in said first support section and a second plug section which is fit in said second support section and which is smaller in cross sectional size than said first plug section, and wherein said plug member is non-circular, and non-rotatable when said plug member is fit in said support portion.

19. A shift lock system according to claim 18 wherein said plug member consists of first and second equivalent half members each of which is substantially a mirror image of the other.

20. A shift lock system according to claim 18 wherein said plug member comprises first and second legs each of which extends in said second direction from said second plug section along said cancel rod; which passes through said support hole of said support member and which has a claw for limiting movement of said plug member in said first direction by abutting against said second support section, said legs projecting from said second support section in said second direction and said claws being apart from said second support section when said plug member is fit in and fastened to said support portion.

21. A shift locking system according to claim 7 wherein said shift locking means is mounted on said shift lever assembly, and said canceling means is also mounted on said shift lever assembly.

22. A shift lock system according to claim 7 wherein said shift locking means is mounted on said shift lever assembly, and said canceling means is mounted on said base structure.

* * * * *